United States Patent [19]

Haendle et al.

[11] Patent Number: 4,503,459
[45] Date of Patent: Mar. 5, 1985

[54] X-RAY DIAGNOSTIC INSTALLATION FOR PROVIDING SUBTRACTION IMAGES

[75] Inventors: Joerg Haendle, Erlangen; Wolfgang Maass, Nuremberg, both of Fed. Rep. of Germany

[73] Assignee: Siemens Aktiengesellschaft, Berlin & Munich, Fed. Rep. of Germany

[21] Appl. No.: 421,286

[22] Filed: Sep. 22, 1982

[30] Foreign Application Priority Data

Dec. 14, 1981 [DE] Fed. Rep. of Germany ....... 3149483

[51] Int. Cl.³ .............................................. H04N 5/32
[52] U.S. Cl. .................................... 358/111; 128/653; 128/654; 378/99; 364/414
[58] Field of Search ......................... 358/111; 378/99; 364/414; 128/653, 654

[56] References Cited

U.S. PATENT DOCUMENTS

| 4,204,225 | 5/1980 | Mistretta | 358/111 |
| 4,204,226 | 5/1980 | Mistretta | 358/111 |
| 4,272,782 | 6/1981 | Proper et al. | 358/111 |
| 4,394,684 | 7/1983 | Verhoeven | 358/111 |
| 4,398,213 | 8/1983 | Haendle et al. | 358/111 |
| 4,425,580 | 1/1984 | Haendle et al. | 358/111 |

Primary Examiner—Howard W. Britton
Assistant Examiner—John K. Peng
Attorney, Agent, or Firm—Hill, Van Santen, Steadman & Simpson

[57] ABSTRACT

An exemplary embodiment comprises an image intensifier television chain, a subtraction device which has at least one image memory and a difference stage for providing subtraction images through difference formation from the stored video signals and chronologically displaced video signals, and a monitor. There is series connected with the subtraction device a circuit with a high-pass filter characteristic for the purpose of two-dimensional spatial frequency filtering.

5 Claims, 2 Drawing Figures

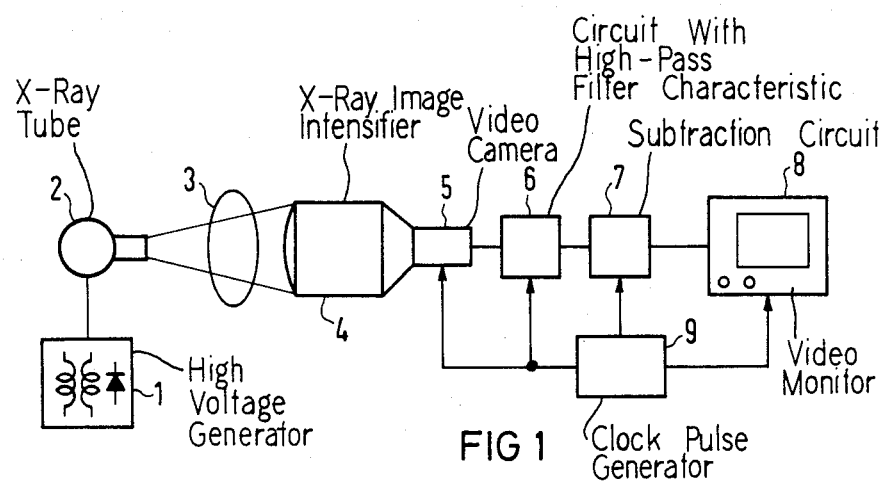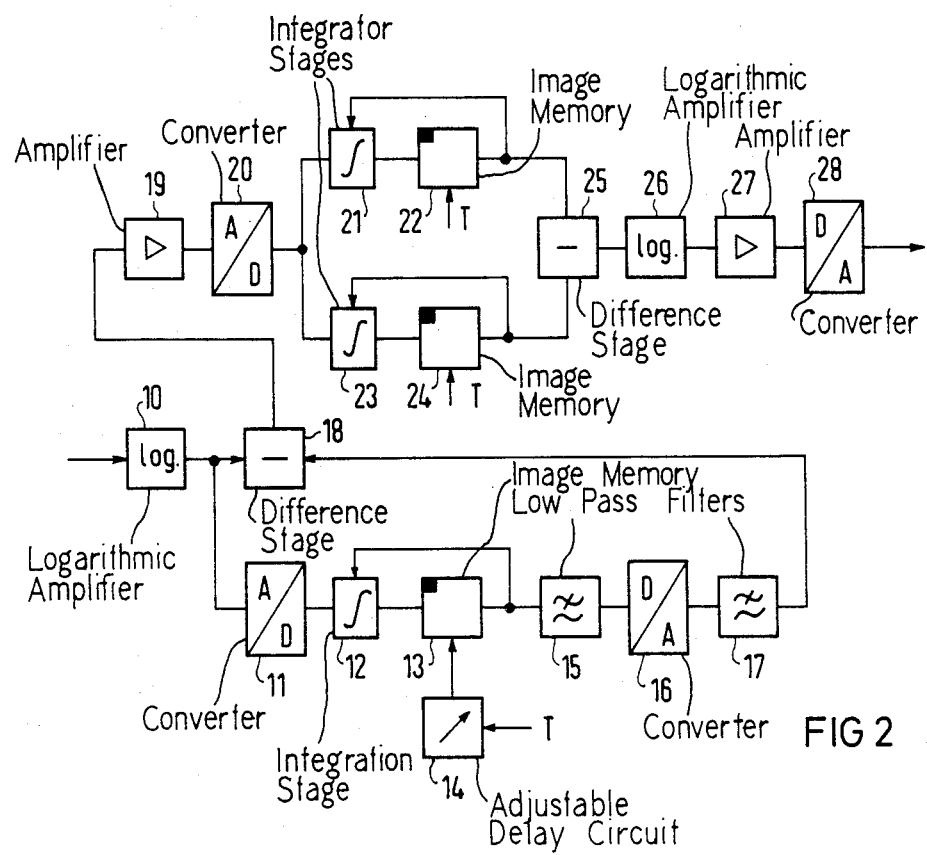

X-RAY DIAGNOSTIC INSTALLATION FOR PROVIDING SUBTRACTION IMAGES

BACKGROUND OF THE INVENTION

The invention relates to an X-ray diagnostic installation, comprising an image intensifier television chain, comprising a subtraction device, which exhibits at least one image memory and a difference stage for providing subtraction images through difference formation from the stored video signals and chronologically displaced video signals, and comprising a monitor. Subtraction images are employed in angiography in order to render clearly visible blood vessels which in the normal X-ray image can be only poorly recognized and on which bone structures are superimposed.

In German Pat. No. 30 18 129 and in the corresponding U.S. Pat. No. 4,398,213 issued Aug. 9, 1983, an X-ray diagnostic installation for providing subtraction images is described in which, in a memory, a blank image averaged over several scannings, i.e. an image without contrast medium filling, is stored. Subsequently, a contrast medium is injected. The filling images are now either directly supplied to a difference stage (fluoroscopy subtraction) or stored in an additional image memory, averaged over several scannings. In the difference stage the subtraction of the blank image from the filling image proceeds, so that, at a series connected monitor subsequently only the filled vessels which are of interest can be seen.

The storage of the images proceeds in digital image memories. The subtraction and the further processing are likewise digitally conducted. To this end, the video signals are digitized in an analog-to-digital converter (A/D converter) and, following completed processing, are reconverted to analog video signals in a digital-to-analog converter (D/A converter) and displayed on a monitor. The conventional A/D converters, given a clock pulse frequency corresponding to the video image rate may exhibit an amplitude depth of eight bits. Indeed, A/D converters with a higher amplitude depth can also be employed. However, the latter presently operate with a lower clock pulse frequency so that fluoroscopy records can be provided only in a time-delayed fashion. However, losses of definition due to movement can result under these circumstances.

The vessels illustrated in the digital subtraction technique have, in the spatial frequency spectrum, a predominant spectral component with high spatial frequencies. Through the modulation transfer function of the X-ray image intensifier chain, there result, for these spectral components, relatively low amplitude values in comparison with the remaining image contents which are provided by the contrast of greater surface components. Therefore, in the case of a conventional X-ray video signal, relative to the vessel representation, a relatively poor utilization of the amplitude range of the analog-to-digital converter is attained. The resolution is thereby strongly restricted and one obtains a low signal-to-noise ratio.

SUMMARY OF THE INVENTION

The invention proceeds from the objective of producing an X-ray diagnostic installation of the type initially cited wherein the entire amplitude range of the A/D converter is employed for the subtraction technique and the signal-to-noise ratio in the digital subtraction image is thereby improved.

In accordance with the invention, the object is achieved in that there is series connected with the subtraction device, a circuit with high-pass filter characteristic for the purpose of two-dimensional spatial frequency filtering. Through this high-pass filter circuit, the image regions exhibiting a great amplitude, which are uninteresting for the subtraction technique, are suppressed, so that the A/D converter can be better adapted to the high-frequency image parts.

A simple and intereference-insensitive construction results if, for the purpose of obtaining the high-pass filter characteristic, a low-pass filter circuit is present whose low frequency output signal is subtracted from the input signal in an additional difference stage. The image noise can be reduced if the low-pass filter circuit contains an additional image memory in which the image point data of several images are superimposed.

The invention shall be explained in greater detail in the following on the basis of an exemplary embodiment illustrated on the accompanying drawing sheet; and other objects, features and advantages will be apparent from this detailed disclosure and from the appended claims.

BRIEF DESCRIPTION OF THE DRAWINGS

FIG. 1 illustrates a block circuit diagram of an inventive X-ray diagnostic installation; and FIG. 2 illustrates a block circuit diagram of the circuit with a high-pass filter characteristic and of the subtraction device of the X-ray diagnostic installation according to FIG. 1.

DETAILED DESCRIPTION

In FIG. 1 an X-ray diagnostic installation comprising an X-ray tube 2, fed by a high voltage generator 1 is illustrated in the ray path of which a patient 3 is disposed. An X-ray image intensifier 4, following in the ray path is connected with a video camera 5 whose output is supplied to a circuit having a high-pass filter characteristic 6. Its output signal is processed in a subtraction circuit 7 and displayed on a monitor 8. A synchronous clock pulse generator 9 controls the synchronization of the chronological functional sequences of the video camera 5, the filter circuit 6, the subtraction device 7, and the monitor 8.

There is supplied to the filter circuit 6, illustrated in FIG. 2, the analog video signal of the video camera 5 which is logarithmized in a logarithmic amplifier 10 forming the input stage. Subsequently, the signal is digitized in an A/D converter 11. The output of the A/D converter 11 is connected with an integration stage 12. The output signal of the integration stage 12 is read into an image memory 13 whose output is fed back to the second input of the integration stage 12. Supplied to the image memory 13 is the clock pulse frequency of the synchronous clock pulse generator 9 via a delay circuit 14. The output of the image memory 13 is connected with a two-dimensional low-pass filter 15 whose output signal is converted in a D/A converter 16 into analog signals. The D/A converter 16 is connected with an electrically phase-pure low-pass filter 17. The low frequency signal of the low-pass filter 17 is subtracted from the actual or currently occurring video signal in a first difference stage 18.

The difference signal of the difference stage 18 is amplified in an amplifier 19 and subsequently digitized in an A/D converter 20. The output of the A/D converter 20 is connected with two parallel-connected integration stages 21 and 23 which are respectively connected to additional image memories 22 and 24. The outputs of the image memories 22 and 24 are fed back to the second inputs of the integration stages 21 and 23. The X-ray imagesstored in the image memories 22 and 24 are subtracted from one another in a second difference stage 25. The output signal of the difference stage 25 can be applied to a logarithmic amplifier 26 and to a digital amplifier 27. In a D/A converter 28, the digital signal is converted into an analog signal which can be displayed on the monitor 8.

Before the analog video signal is supplied to the subtraction circuit 7, which contains the components 19 through 28, it is subjected to a spatial frequency filtering with a high-pass filter characteristic. To this end, the video signal passes through the digital low-pass filter circuit 11 through 17. In the image memory 13 the video signals of several video images are superimposed in image point fashion.

In the following low-pass filter 15 the contents of the image memory 13 are subjected to a low-pass filtering in image point fashion, whereby the image points of the adjacent environment are, respectively, jointly included. Thus, for example, for the fifth image point in the fifth line, the fourth and sixth image points in the fifth line and the fifth image points of the fourth and sixth lines can be detected. Likewise, the fourth and sixth image points of the fourth and sixth lines could be jointly taken into consideration. An expansion of the environment exceeding this would also be conceivable. In addition, the further removed image points could be multiplied with an attenuation function.

Through the phase of the clock pulse frequency of the image memory 13, which phase is adjustable in the delay circuit 14, the phase equalization for the low-pass filter circuit 11 through 17 is conducted. One thus achieves a pointprecise coincidence of the actual or currently occurring video signal and the low-pass-filtered video signal. Through the subtraction of the two video signals in the difference stage 18, one obtains only the high frequency components of the video signal.

Through the feedback circuit of the integration stage 12 and of the image memory 13, one can conduct a weighted mean value formation, so that the video images are largely free of noise.

The difference signal from the difference stage 18 thus has a lower amplitude than the video signal. In order that the amplitude range of the A/D converter can be entirely utilized, the difference signal is amplified in the amplifier 19 so as to have the maximally possible amplitude range. In the image memory 22, through the feedback circuit with the integration stage 21, a blank (or non-contrast-filled) image, averaged over several video images, is stored. After completed injection of the contrast medium, several images are superimposed in the image memory 24 through the feedback loop with the integration stage 23, which images correspond to a noise-free filling image. In the second difference stage 25, the filling image and the blank image are now subtracted. The angiographic subtraction image is displayed on the monitor 8.

Through this subtraction technique the decisive useful information, the high frequency component of the video signal, is compressed to a relatively small amplitude range and subsequently spread to the full amplitude range of the A/D converter. The resolution of the subtraction images is thereby increased, as a consequence of which the signal to noise ratio is improved.

It will be apparent that many modifications and variations may be effected without departing from the scope of the novel teachings and concepts of the present invention.

We claim as our invention:

1. An X-ray diagnostic installation comprising an image intensifier television chain, a subtraction circuit having at least one image memory and a difference stage for providing subtraction images through difference formation from the stored video signals and chronologically displaced video signals, and a monitor, characterized in that a filter circuit is series connected with the subtraction device, said filter circuit having a high-pass filter characteristic for the purpose of two-dimensional spatial frequency filtering.

2. An X-ray diagnostic installation according to claim 1, characterized in that, in order to attain the high-pass filter characteristic, said filter circuit comprises a low pass filter circuit and an additional difference stage for forming a difference between a low frequency output signal from the low pass filter circuit and the input signal.

3. An X-ray diagnostic installation according to claim 2, characterized in that the low-pass filter circuit contains an additional image memory in which the image point data of several video images are superimposed.

4. In an X-ray diagnostic installation including an image intensifier television chain, a subtraction circuit having at least one image memory and a difference stage for providing subtraction images through difference formation from the stored video signals and chronologically displaced video signals, a monitor, an analog to digital converter having its output connected with said image memory for converting video signals to digital form prior to storage thereof by the image memory, and filter means connected between the image intensifier television chain and the analog to digital converter for filtering the video signals prior to supply thereof to the analog to digital converter, said filter means providing a high-pass filter characteristic such that low frequency components of the video signal are suppressed while high frequency components of the video signals are transmitted by the filter means to the analog to digital converter for use in producing a display of the subtraction images.

5. An X-ray diagnostic installation according to claim 4, with analog amplifier means connected between the filter means and said analog to digital converter and providing an amplification of the high frequency components of the video signal such that the amplified high frequency components entirely utilize the amplitude range of the analog to digital converter.

* * * * *